United States Patent
Kumar et al.

(10) Patent No.: US 11,254,691 B1
(45) Date of Patent: Feb. 22, 2022

(54) METHOD FOR MAKING METAL ORGANIC FRAMEWORKS AND THIN FILM NANOCOMPOSITE MEMBRANES USING THE SAME

(71) Applicant: KUWAIT INSTITUTE FOR SCIENTIFIC RESEARCH, Safat (KW)

(72) Inventors: Rajesha Kumar, Safat (KW); Mansour Ahmed, Safat (KW); Bhadrachari Garudachari, Safat (KW); Jibu P Thomas, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 17/181,258

(22) Filed: Feb. 22, 2021

(51) Int. Cl.
| | | |
|---|---|---|
| *C07F 3/06* | (2006.01) | |
| *C07F 1/08* | (2006.01) | |
| *C01B 37/00* | (2006.01) | |
| *B82Y 40/00* | (2011.01) | |

(52) U.S. Cl.
CPC ............... *C07F 3/06* (2013.01); *C01B 37/002* (2013.01); *C07F 1/08* (2013.01); *B82Y 40/00* (2013.01)

(58) Field of Classification Search
CPC ............. B01J 20/226; B01D 2253/204; C07C 231/02; C07C 231/12; C07C 235/06; C07F 3/06; C07F 1/08; C01B 37/002; B82Y 40/00
See application file for complete search history.

(56) References Cited

U.S. PATENT DOCUMENTS 9,290,518 B2  3/2016  Banerjee et al.
10,723,694 B2 *  7/2020  Makhseed ............ C07C 255/54

FOREIGN PATENT DOCUMENTS

| CN | 108084452 A | 5/2018 |
| CN | 108854569 A | 11/2018 |
| CN | 110449046 A | 11/2019 |
| KR | 20130093997 A | 8/2013 |

OTHER PUBLICATIONS

CAS Abstract Propylphosphonic anhydride (T3P) (1984) (Year: 1984).*
W. Cui et al., 32 Advanced Materials (2020) (Year: 2020).*
F. Rouhani et al., 141 Journal of the American Chemical Society, 11173-11182 (2019) (Year: 2019).*
M. Kalaj et al., 6 ACS Central Science, 1046-1057 (2020) (Year: 2020).*
Z. Bao et al., 9 Energy and Environmental Science, 3612-3641 (2016) (Year: 2016).*
K. Gangu et al., 446 Inorganic Chimica Acta, 61-74 (2016) (Year: 2016).*
S. Meek et al., 23 Advanced Materials, 249-267 (2011) (Year: 2011).*

* cited by examiner

*Primary Examiner* — Alexander R Pagano
(74) *Attorney, Agent, or Firm* — Nath, Goldberg & Meyer; Richard C. Litman (57) ABSTRACT

A method for making metal organic frameworks (MOFs) includes the step of dissolving metal salts in deionized water to form first solution, followed by adding a cyclic propyl phosphonic anhydride reagent to the first solution to form a second solution. The second solution is heated to form a reaction mixture containing MOF crystals, and is then cooled. The MOF crystals are filtered therefrom, washed and dried. To make metal organic framework-based thin film nanocomposite membranes, the MOF crystals are mixed with an m-phenylene diamine aqueous solution to form a mixture, which is then poured on a top surface of an ultrafiltration membrane substrate to form a first intermediate membrane structure. The first intermediate membrane structure is dried, and trimesolyl chloride in n-hexane solution is poured thereon to form a second intermediate membrane structure, which is cured to form an MOF-based thin film nanocomposite membrane, which is then rinsed and dried.

7 Claims, 10 Drawing Sheets

METHOD FOR MAKING METAL ORGANIC FRAMEWORKS AND THIN FILM NANOCOMPOSITE MEMBRANES USING THE SAME

BACKGROUND

1. Field

The disclosure of the present patent application relates to the synthesis of metal organic frameworks (MOFs), and particularly to a method for making metal organic frameworks which may be further used to make thin film nanocomposite membranes for use in water filtration processes and the like.

2. Description of the Related Art

Metal organic frameworks (MOFs) are a class of porous materials which are generally synthesized by reacting an inorganic salt with organic molecules possessing ligand groups in a suitable solvent medium. The inorganic ion forms the central metal atom of the MOF, while the organic molecules (i.e., the ligands, which each have a lone pair of electrons) link to the central metal atom to form a continuous two-dimensional or three-dimensional framework. Such two-dimensional and three-dimensional arrangements form porous structures having high surface areas and high porosities. The porous MOF material may be used in a wide variety of applications, including, but not limited to, gas storage, separation, sensing, catalysis, proton conduction, and the like.

MOFs are desirable for such applications due to their relatively easy synthesis and their tailored shapes and structures (by using a variety of organic linkers), particularly when compared with conventional porous inorganic materials, such as zeolites and carbon-based materials. Recently, MOF-based membranes have been proposed for applications in gas and liquid separation processes. In water separation, the presence of MOFs within the membrane matrix is believed to provide high thermal and mechanical stabilities, high selectivity, and improved life of the membrane. In desalination, the efficiency of ionic separation from the feed under separation is mainly decided by the pore size, pore size distribution, porosity of the substrate layer, surface diffusion, and shape selectivity of the membrane surface. It is believed that the incorporation of a minute quantity of MOFs into the membrane matrix has the potential to greatly improve these characteristics, particularly due to the minute size, high porosity, and larger surface area of MOF materials.

These characteristics suggest that MOF materials may be used to modify the membranes used in traditional water treatment processes, such as nanofiltration (NF), ultrafiltration (UF), forward osmosis (FO) and reverse osmosis (RO). The presence of MOFs in the membrane matrix is expected to improve the porosity and interconnectivity of the water transport channels. Recent research has shown a major improvement in membrane flux by incorporating UiO-66 and MIL-125 MOFs into thin-film nanocomposite membranes. In this research, the improved water flux was attributed to the hydrophilic nature of the MOFs and the high surface area of the MOFs, thus providing additional channels for the water transport.

Further research has shown that the loading of MIL-101 (Cr) MOFs at 0.05% could improve the membrane flux by 44% compared with a neat membrane without MOFs. The loading of MOFs into the organic solvent produced better results during the polyamide layer coating. The MOF, with a size of 200 nm and a high surface area (3264 $m^2$/g), had good compatibility with the membrane active layer to create additional paths for the water molecule transport. Additionally, high compatibility of the organic linkers of the MOF with the membrane polymer matrix was also demonstrated.

UiO-66, a zirconium-based MOF, incorporated into a thin film nanocomposite (TFN) FO membrane showed enhanced selectivity and 40% higher permeability when compared to a neat thin film composite (TFC) membrane. A minute composition with 0.1 wt % loading of MOF was found to be efficient for achieving optimal membrane performance when evaluated in terms of flux. Further, a FO membrane was synthesized with a MOF containing silver (I) metal atoms with 1,3,5-benzene tricarboxylic acid (3HBTC) as an organic linker. The loading of MOF was successfully carried out into a polyamide (PA) layer to achieve improved hydrophilicity, flux and selectivity during seawater desalination. Minimal 0.04 wt % loading of the MOF was found to increase the water flux by 27%.

A similar strategy was used to incorporate an MOF nanosheet, consisting of copper 1,4-benzene dicarboxylate (CuBDC), into the active PA layer of the TFN FO membrane. This demonstrated the major role played by MOFs on improving the resultant membrane permeability (a 50% improvement) and the antifouling characteristics, but without affecting the selectivity. However, stability issues of each of the above MOF filters limits their applications. Thus, there is great interest in designing MOFs with hydrophobic organic linkers to obtain water repellent characteristics and to achieve long term performance for a variety of applications. It should be noted that membranes for desalination applications require water-stable MOF materials, since the liquid feed under separation is in direct contact with the membrane surface, which contains the MOF. Thus, a method for making metal organic frameworks and a method of making thin film nanocomposite membranes using the same solving the aforementioned problems are desired.

SUMMARY

A method for making metal organic frameworks (MOFs) includes an initial step of dissolving metal salts in deionized water to form a first solution and adding a cyclic propyl phosphonic anhydride reagent to the first solution to form a second solution. The second solution is then heated to a temperature of 80° C. to form a reaction mixture including metal organic framework crystals. The reaction mixture is cooled to 26° C., and the metal organic framework crystals are filtered therefrom. The metal organic framework crystals are then washed and dried.

In order to make metal organic framework-based thin film nanocomposite membranes, the metal organic framework crystals are mixed with an m-phenylene diamine aqueous solution to form a mixture, which is then poured on a top surface of an ultrafiltration membrane substrate to form a first intermediate membrane structure. The first intermediate membrane structure is dried, and trimesolyl chloride in n-hexane solution is poured thereon to form a second intermediate membrane structure. The second intermediate membrane structure is cured to form a metal organic framework-based thin film nanocomposite membrane, which is then rinsed and dried.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method for making metal organic frameworks (MOFs) includes an initial step of dissolving metal salts in deionized water to form a first solution and adding a cyclic propyl phosphonic anhydride reagent to the first solution to form a second solution. The second solution is heated at a temperature of 80° C. to form a reaction mixture containing metal organic framework crystals. The reaction mixture is cooled to 26° C., and the metal organic framework crystals are filtered therefrom. The metal organic framework crystals are then washed and dried. The present method can yield MOFs with >97% purity.

The following describes examples for making the metal organic frameworks using $ZnCl_2$ and $CuSo_4$ as the exemplary metal salts (resulting in metal organic frameworks hereinafter referred to as "KISR-Zn-MOF" and "KISR-Cu-MOF", respectively), however, it should be understood that a similar method may be used to make MOFs with any suitable type of metal salt. Non-limiting examples of such metal salts include metal salts formed from d-block metals (M-Sc, Ti, V, Cr, Mn, Fe, Co, Ni, Cu, Zn, Y, Zr, Nb, Mo, Tc, Ru, Rh, Pd, Cd, La, W, Os, Ir, Pt, Au, Hg), f-block metals (M-Sm, Eu, Gd, Tb, Dy, Ho), p-block metals (M-Al, Ga, In, Ge, Sn, Pb), alkali metals (M-Na, K, Rb, Cs), alkaline earth metals (M-Mg, Ca, Sr, Ba) and the like.

In the exemplary preparations of KISR-Zn-MOF and KISR-Cu-MOF, respectively, $ZnCl_2$ and $CuSO_4$, respectively, were mixed with deionized water in a reagent bottle at a temperature of 26° C. Stirring was continued until the crystals of the metal salt completely dissolved in the deionized water. A cyclic propyl phosphonic anhydride reagent (sold under the name T3P® by Archimica GMBH Corporation of Germany) was added and the solution was stirred for an additional 10 minutes. This resulted in a light yellow homogeneous solution, which was sealed with an airtight cap and kept inside a hot air oven which was preheated to a temperature of 80° C. The initial MOF crystal formation was observed after 4 hours and the heating process was continued over a period of 32 hours to complete the reaction process. The reaction mixture including the crystalline MOF was cooled to 26° C. The resultant crystals were off-white colored needle-shaped MOF crystals, and were filtered from the mixture using a sintered glass crucible. Washing of the MOF crystals was repeated three times to remove any traces of hydrolyzed T3P® from the product. The resultant MOF material was stored in a hot air oven at 50° C. for 48 hours to remove any traces of moisture.

Figure 1:
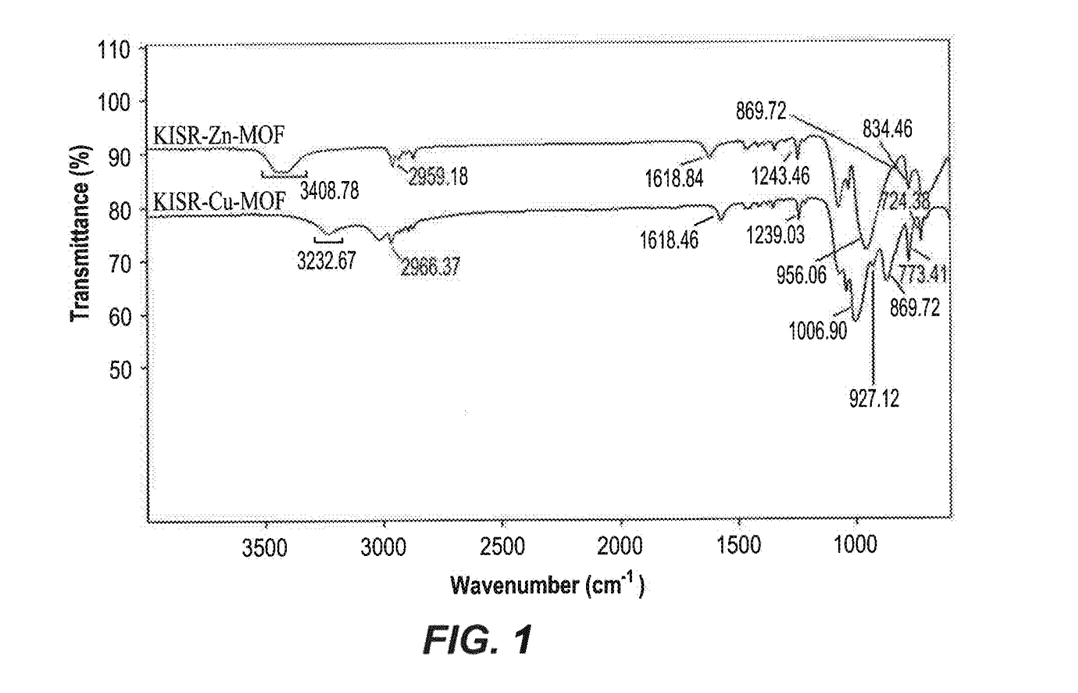
FIG. 1 is a graph showing Fourier transform infrared (FTIR) spectroscopy results for metal organic frameworks (KISR-Zn-MOF and KISR-Cu-MOF) prepared using the method for making metal organic frameworks.

Fourier transform infrared (FTIR) spectroscopy was used to characterize the MOFs. The spectrum for both MOFs is shown in FIG. 1, where an aliphatic C—H stretching of propyl groups at 2959.18 $cm^{-1}$ can be seen. The absorption peak at 927.12 $cm^{-1}$ indicates the presence of a —P—O—P linkage, with a peak at 1243.46 $cm^{-1}$ for a —P=O stretch, and at 956.06 $cm^{-1}$ for a (P—O) stretch, thus confirming the structure of propyl phosphonic acid derivative in the newly synthesized MOF. The broad peak at 3408.78 $cm^{-1}$ is attributed to the loosely bound water molecules in the pores of the MOF. Additionally, a peak at 1618.84 cm$^{-1}$ for O—H scissors is observed and is related to the water molecule. The peak at 834.46 cm$^{-1}$ corresponds to the Zn—OH linkage between the Zn metal atom —OH group of propyl phosphonic acid.

The spectrum of KISR-Cu-MOF shows minor changes in its characteristic peaks related to the major functional groups. The aliphatic C—H stretching of propyl groups appears at the slightly higher value of 2966.37 cm$^{-1}$. An absorption peak at 869.72 cm$^{-1}$ indicates the presence of a —P—O—P linkage, with a peak at 1239.03 cm$^{-1}$ for a —P═O stretch, and at 1006.90 cm$^{-1}$ for a (P—O) stretch, thus confirming the linkage of propyl phosphonic acid derivative to Cu metal atom in the newly synthesized MOF. The broad peak at 3232.67 cm$^{-1}$ is attributed to the loosely bound water molecules in the pores of the MOF. Additionally, a peak at 1618.46 cm$^{-1}$ for the O—H scissors is observed and is related to the water molecule. The peaks 773.41 cm$^{-1}$ and 724.38 cm$^{-1}$ correspond to the Cu—OH linkage between Cu metal atom —OH group of propyl phosphonic acid.

Figure 2:
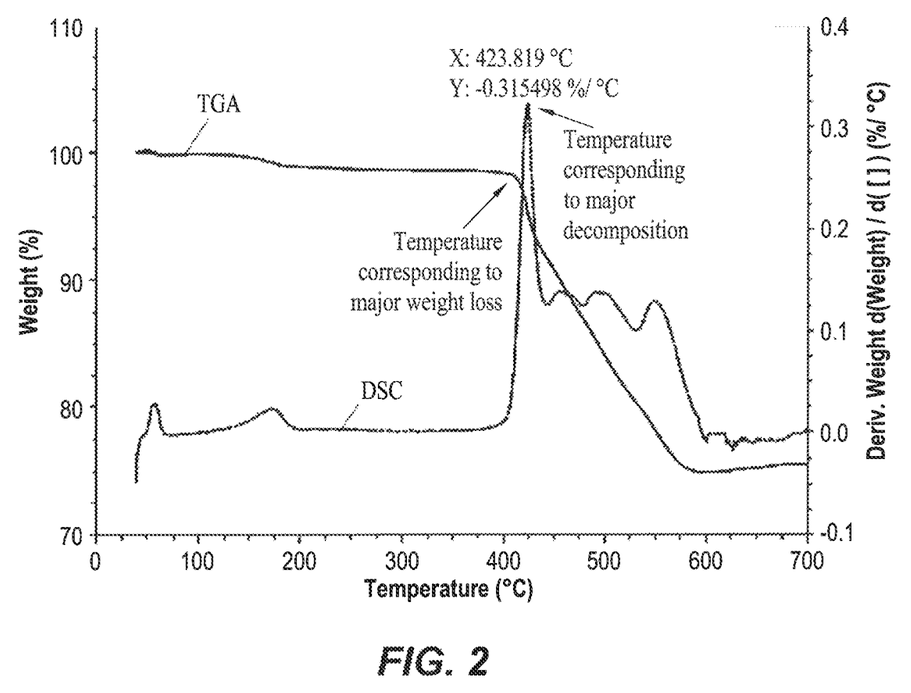
FIG. 2 is a graph showing thermogravimetric (TGA) analysis and differential scanning calorimetry (DSC) results for the KISR-Zn-MOF metal organic framework.
Figure 3:
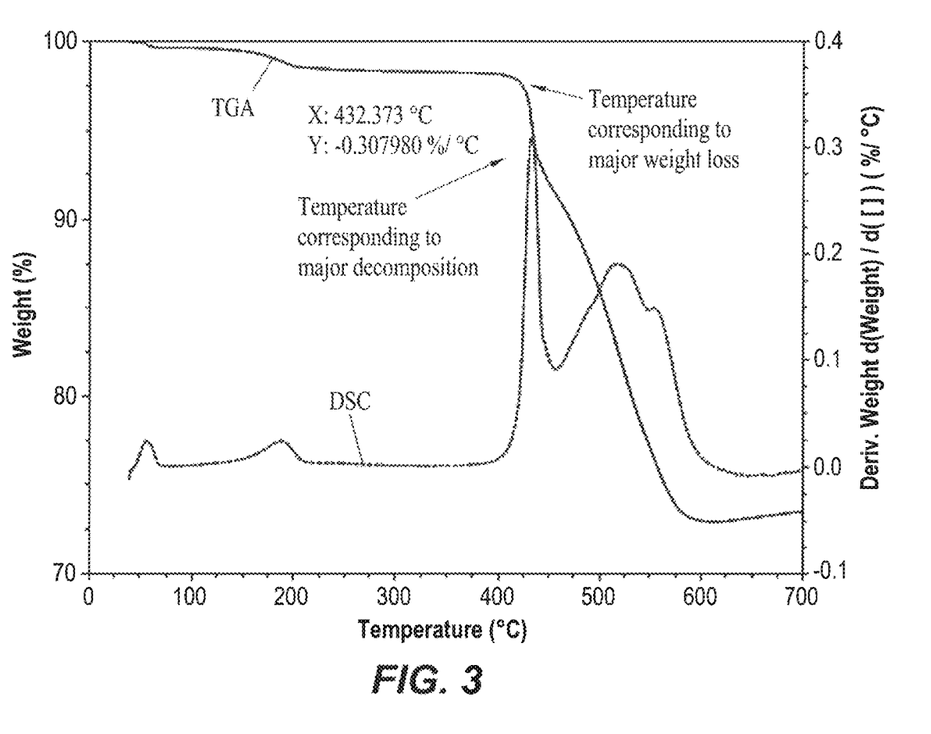
FIG. 3 is a graph showing thermogravimetric (TGA) analysis and differential scanning calorimetry (DSC) results for the KISR-Cu-MOF metal organic framework.

The possible degradation mechanism of KISR-Zn-MOF and KISR-Cu-MOF was studied using thermogravimetric (TGA) analysis and differential scanning calorimetry (DSC), and the results can be seen in FIGS. 2 and 3, respectively. The TGA curves of FIGS. 2 and 3 show the stability of KISR-Zn-MOF and KISR-Cu-MOF materials up to 400° C., thus demonstrating the high thermal stability of the MOF materials. For both types of MOF, the material decomposition temperature was above 400° C. The DSC curves of FIGS. 2 and 3 further show the thermal stability of the prepared MOFs. As can be seen, there is no major weight loss for KISR-Zn-MOF or KISR-Cu-MOF up to 400° C. The weight loss for KISR-Zn-MOF and KISR-Cu-MOF is observed at 423.8° C. and 432.3° C., respectively, which is attributed to the thermal stability of the materials upon heating.

In order to test water stability, 20 mg each of the KISR-Zn-MOF and KISR-Cu-MOF samples were suspended in 10 mL of deionized water and left undisturbed at room temperature for 10 days. After exposure to an aqueous medium, the material was recovered through filtration and dried at 60° C. To ensure that a portion of the material was not dissolved in the aqueous solution, the final mass of the material was recorded. The percentage of recovered material is calculated as mi/mr×100, where mi and mr are the initial and recovered masses of the MOF material, respectively. The chemical stability of the recovered MOF was determined by infrared attenuated total reflection (ATR-IR) spectral studies by comparing the initial and final spectra of the MOF samples after treatment with the water.

Figure 4:
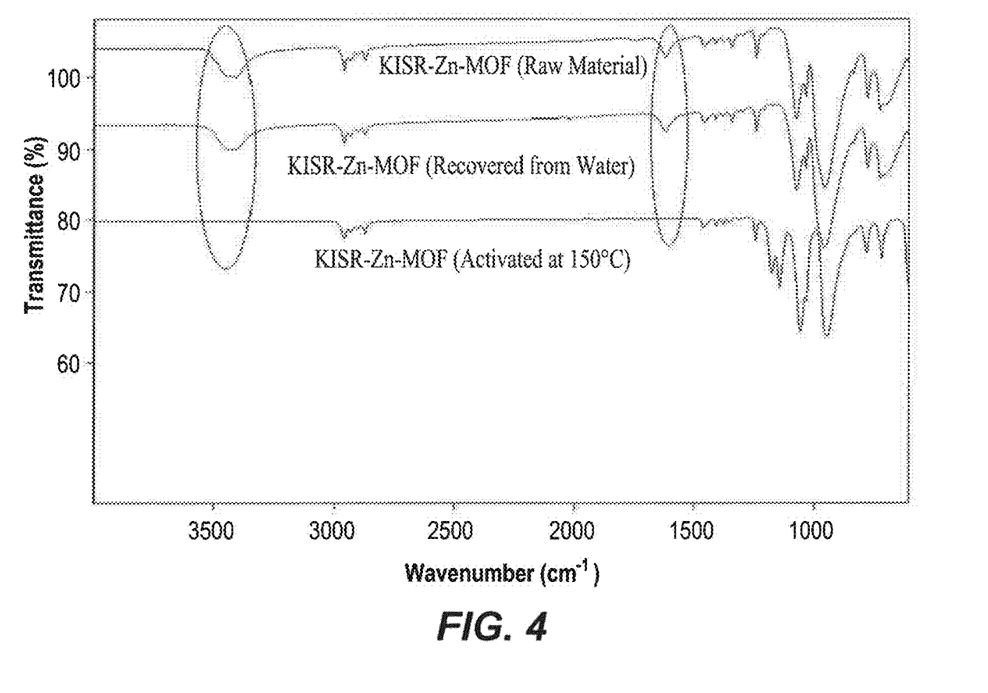
FIG. 4 is a graph showing infrared attenuated reflection (ATR-IR) spectra for KISR-Zn-MOF, comparing untreated or "raw" conditions with post-water treatment and following activation at 150° C.
Figure 5:
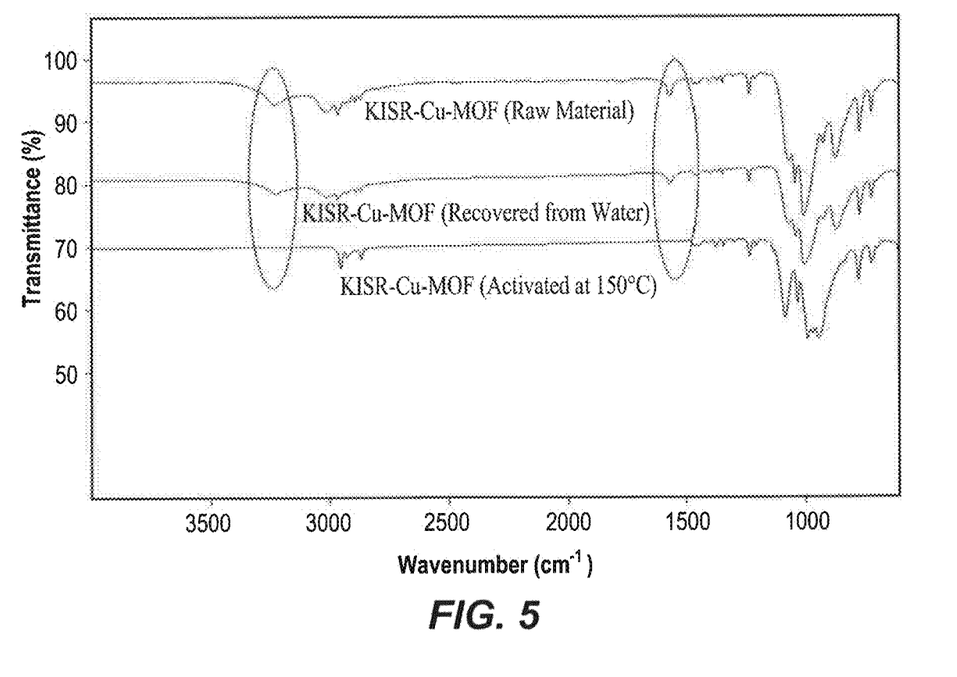
FIG. 5 is a graph showing infrared attenuated reflection (ATR-IR) spectra for KISR-Cu-MOF, comparing untreated or "raw" conditions with post-water treatment and following activation at 150° C.

FIGS. 4 and 5 show the ATR-IR spectra for the KISR-Zn-MOF and KISR-Cu-MOF samples, respectively, comparing untreated or "raw" conditions with post-water treatment and following activation at 150° C. As seen in FIG. 4, the IR spectrum of KISR-Zn-MOF recovered from water resembles the spectrum of raw KISR-Zn-MOF, except for a slight broadening of a peak corresponding to the water at ~3500 cm$^{-1}$, indicating the stability KISR-Zn-MOF to retain its chemical stability after dispersing in water for a long duration. Additionally, the gravimetric analysis revealed 99.9% of material recovery after the water treatment trials.

To further determine the thermal stability, the MOF samples were heated at 150° C. for 1 hour each. The ATR-IR spectral and differential scanning calorimetry (DSC) studies were used to determine the thermal stability of the MOF samples after the heat treatment. As shown in FIG. 4, for KISR-Zn-MOF, the peaks corresponding to loosely bound water molecules in the pores of the MOF appearing at 3408.78 cm-1 and 1618.84 cm$^{-1}$ completely disappeared after heating the material at 150° C. FIG. 5 shows that, for KISR-Cu-MOF, the peaks corresponding to loosely bound water molecules in the pores of the MOF appearing at 3232.67 cm$^{-1}$ and 1618.46 cm$^{-1}$ completely disappeared after heating the material at 150° C. This is mainly due to the release of the loosely bound water molecules by the MOF at the elevated temperature of 150° C., as expected. It should be noted that the IR spectra of both MOF materials retained their original characteristic peaks corresponding to the different functional groups, thus confirming the stability of the MOF materials at higher temperatures.

In order to make metal organic framework-based thin film nanocomposite membranes, the metal organic framework crystals are mixed with an m-phenylene diamine aqueous solution to form a mixture, which is then poured on a top surface of an ultrafiltration membrane substrate to form a first intermediate membrane structure. The first intermediate membrane structure is dried, and trimesolyl chloride in n-hexane solution is poured thereon to form a second intermediate membrane structure. The second intermediate membrane structure is cured to form a metal organic framework-based thin film nanocomposite membrane, which is then rinsed and dried.

The thin film composite (TFC) membrane is formed from a thin selective layer of polyamide (PA) cast over the surface of a substrate or support formed from an ultrafiltration membrane. The TFC membrane is prepared by forming a coating of the PA layer over the surface of the ultrafiltration membrane support. The support layer of the TFC nanofiltration (NF) membrane may be fabricated using a wide range of polymers, including, but not limited to, polysulfone, polyethersulfone, polyetheretherketone, polyvinylidene fluoride, polypropylene, polytetrafluoroethylene, polyphenylsulfone, polyetherimide, polyacrylonitrile and the like, via the process of non-solvent induced phase separation with a molecular weight cut-off range between 5000-5500 Da. To guarantee experimental reproducibility, a commercially available ultrafiltration (UF) membrane was chosen as the support layer, on which the introduction of nanodiamond particles mediated the interfacial reaction of m-phenylene diamine (MPD) and trimesoyl chloride (TMC). Table 1 below shows the specifications of the UF membrane support used for the coating of a nano-porous trimesic acid layer.

TABLE 1

| UF Membrane Support Specifications | |
|---|---|
| pH range (25° C.) | 1-11 |
| Flux | 90/50 CED/psi |
| MWCO | 5,000 Da |
| Polymer | Polyethersulfone |
| Vendor | GE ® Osmonics of New York |

The top active polyamide layer of the TFC membrane was prepared by an interfacial polymerization reaction on the surface of a substrate layer. 2% (w/v) m-phenylene diamine (MPD) aqueous solution was poured onto the top surface of the substrate, which was held horizontal for 2 minutes at 25-26° C. to ensure the penetration of amine solution into the pores of the substrate. The excess amine solution was then drained off from the surface of the substrate and an air gun was used to remove the residual droplets of amine from the substrate surface. 100 mL of 0.1% (w/v) trimesolyl chloride (TMC) solution in n-hexane was poured onto the substrate surface. The acid solution was drained off from the surface after 1 minute of contact time. The TFC membrane was then cured at 80° C. in an oven for 5 minutes. The unreacted amine and acid from the TFC membrane surface were removed by rinsing with pure n-hexane and the membranes were dried at 25-26° C. A neat TFC membrane was prepared without adding any nanomaterial. The prepared membrane, hereinafter referred to as "TFC-KISR-Zn-0", was stored in deionized water until further characterization and nanofiltration experiments, as will be discussed in greater detail below.

The coating protocol over the UF membrane during the synthesis of metal organic framework-based thin film nanocomposite (TFN) membranes is similar to that of the TFC membrane synthesis. However, KISR-Zn-MOF was dispersed in aqueous MPD solution during the interfacial polymerization reaction. KISR-Zn-MOF phosphonic acid linkers were well dispersed in the aqueous MPD solution. The acid-amine interactions between phosphonic acid and amine groups of the MPD could be the reason for the high dispersion of KISR-Zn-MOF molecules. Further, sonication followed by stirring for 30 minutes at 25-26° C. improved the dispersion of the MOF in the MPD solution. The well-dispersed MOF resulted in minimal agglomeration of the particles on the membrane surface. All of the prepared TFN membranes were stored in deionized water until they were tested via nanofiltration experiments. The newly prepared TFN membranes, with two different compositions, are hereinafter referred to as "TFN-KISR-Zn-0.05" and "TFN-KISR-Zn-0.1", where 0.05 and 0.1 represent the weight % of MOF loaded into the active PA layer, respectively.

Figure 6:
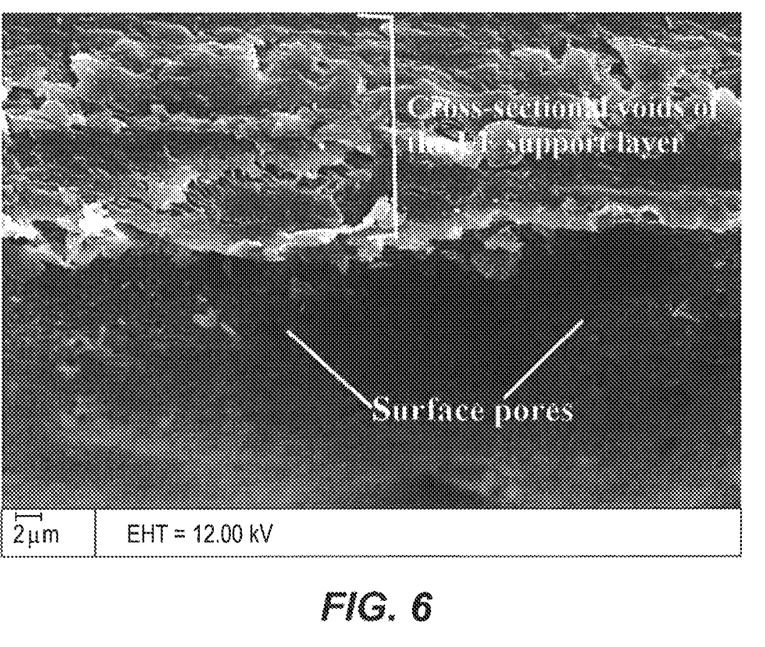
FIG. 6 is a scanning electron microscope (SEM) image of a polyethersulfone (PES) ultrafiltration substrate membrane.
Figure 7A:
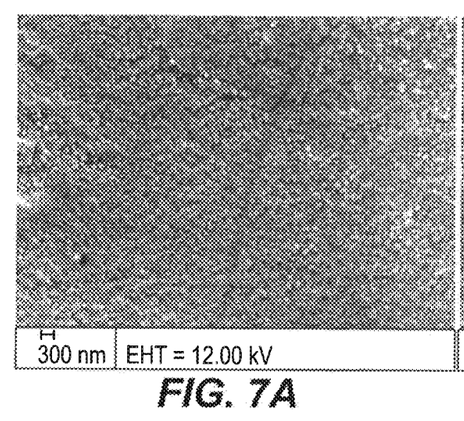
FIG. 7A is a scanning electron microscope (SEM) image of a TFC-KISR-Zn-0 thin film composite membrane at a magnification of 30,000 times.
Figure 7B:
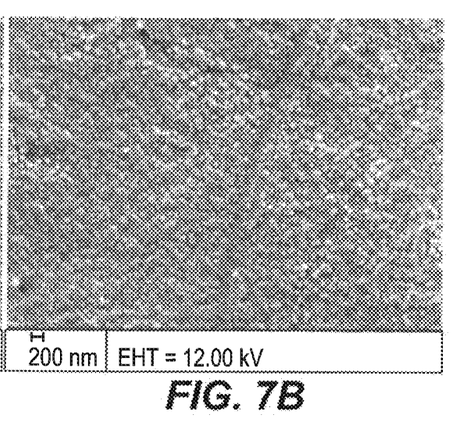
FIG. 7B is a scanning electron microscope (SEM) image of the TFC-KISR-Zn-0 thin film composite membrane at a magnification of 40,000 times.
Figure 8A:
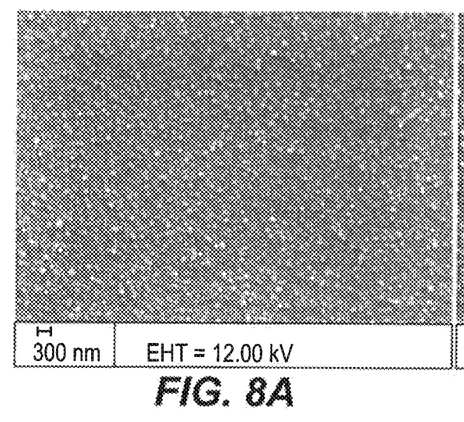
FIG. 8A is a scanning electron microscope (SEM) image of a TFN-KISR-Zn-0.1 metal organic framework-based thin film nanocomposite (TFN) membrane at a magnification of 30,000 times.
Figure 8B:
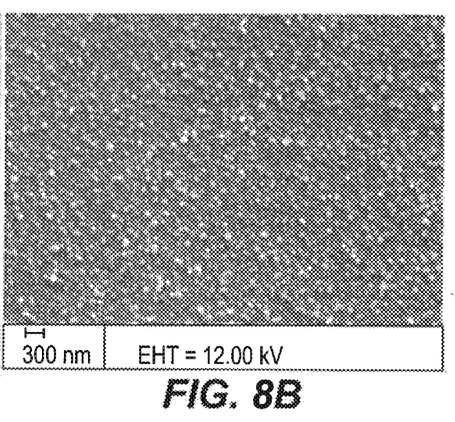
FIG. 8B is a scanning electron microscope (SEM) image of a TFN-KISR-Zn-0.1 metal organic framework-based thin film nanocomposite (TFN) membrane at a magnification of 40,000 times.
Figure 9A:
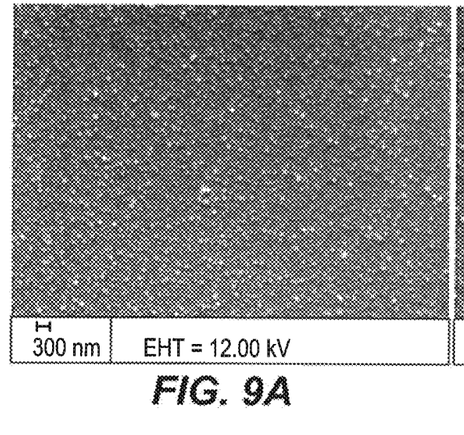
FIG. 9A is a scanning electron microscope (SEM) image of a TFN-KISR-Zn-0.05 metal organic framework-based thin film nanocomposite (TFN) membrane at a magnification of 30,000 times.
Figure 9B:
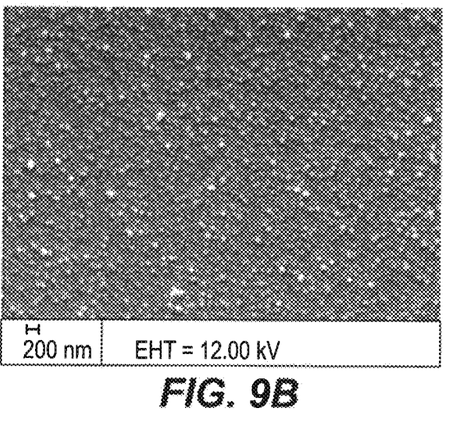
FIG. 9B is a scanning electron microscope (SEM) image of a TFN-KISR-Zn-0.05 metal organic framework-based thin film nanocomposite (TFN) membrane at a magnification of 40,000 times.

The surface and cross-sectional morphology of the prepared TFC and TFN membranes were analyzed using scanning electron microscopy (SEM). The membrane samples were gold-sputtered for a minimum of 5 minutes before imaging to avoid charging effects. The surface coating of a (PES) UF support membrane (formed via the interfacial polymerization reaction described above) resulted in the formation of a thin polyamide layer coating over the UF support. The cross-sectional images of the TFC and TFN membranes revealed the asymmetric nature of the membranes. The pores which originally appeared on the surface of the UF support, as shown in FIG. 6, were covered with a dense polyamide layer during the formation of the TFC and TFN membranes. The TFC-KISR-Zn-0 membrane was formed with nodular structures on the surface due to the cross-linking reaction between the TMC and MPD, as shown in FIGS. 7A and 7B. Such nodular types of structures were replaced with spherical globular structures for TFN-KISR-T3P-Zn-0.05 due to the loading of KISR-Zn-MOF particles, as shown in FIGS. 9A and 9B. The surface images shown in FIGS. 9A and 9B also reveal the uniform dispersion of MOF particles without undergoing the agglomeration effect. Further loading of KISR-Zn-MOF at 0.1 wt % was effective in generating the uniformly dispersed MOF on the TFN membrane surface, as shown in FIGS. 8A and 8B.

Figure 10A:
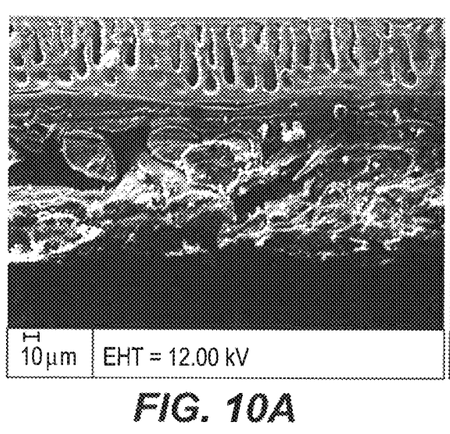
FIG. 10A is a cross-sectional SEM image of the TFC-KISR-Zn-0 thin film composite membrane.
Figure 10B:
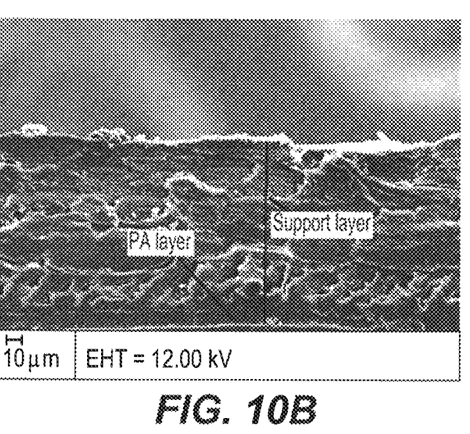
FIG. 10B is a cross-sectional SEM image of the TFN-KISR-Zn-0.05 metal organic framework-based thin film nanocomposite (TFN) membrane.
Figure 10C:
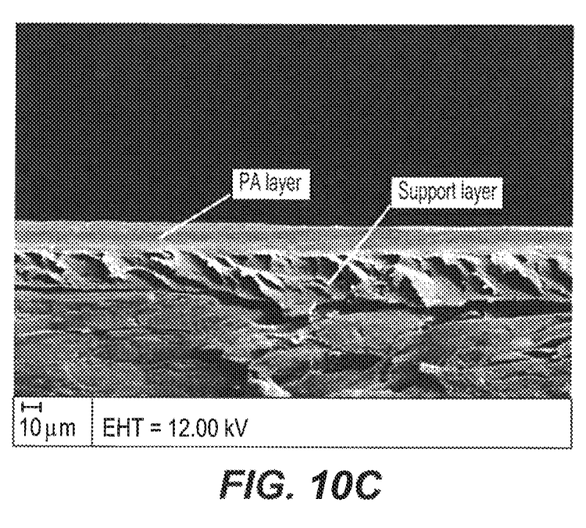
FIG. 10C is a cross-sectional SEM image of the TFN-KISR-Zn-0.1 metal organic framework-based thin film nanocomposite (TFN) membrane.

The SEM study revealed that the higher loading of KISR-Zn-MOF resulted in the formation of more globular structures on the membrane surface due to the deposition of the higher content of MOF on the membrane surface without agglomeration. The higher dispersion of MOF may be attributed to the affinity of abundant hydroxyl groups of MOF with the polar —$NH_2$ groups of the MPD molecules as well as the polar water molecules used for the dispersion of MOF. It should be noted that the further loading of KISR-Zn-MOF at 0.15 wt % resulted in the formation of lumps in the aqueous MPD solution, and the solution was exempted from the further membrane synthesis process. FIGS. 10A, 10B and 10C respectively show cross-sectional SEM images of the TFC-KISR-Zn-0, TFN-KISR-Zn-0.05, and TFN-KISR-Zn-0.1 membranes.

Figure 11A:
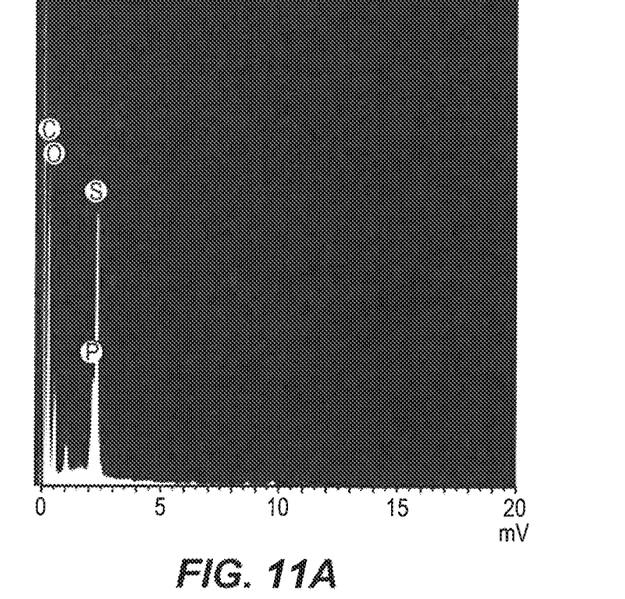
FIG. 11A shows the results of an elemental mapping study of the TFN-KISR-Zn-0.1 metal organic framework-based thin film nanocomposite (TFN) membrane on the distribution of various atoms, including the phosphorous atom of KISR-Zn-MOF.
Figure 11B:
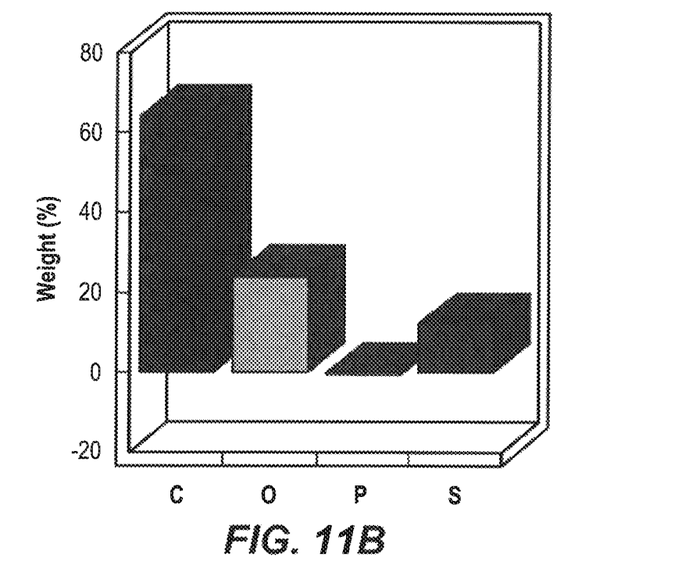
FIG. 11B is a graph showing the weight percentage of the atoms present on the membrane surface from the elemental mapping study of FIG. 11A.

FIG. 11A shows the results of an elemental mapping study of the TFN-KISR-Zn-0.1 metal organic framework-based thin film nanocomposite (TFN) membrane on the distribution of various atoms, including the phosphorous atom of KISR-Zn-MOF. FIG. 11B is a graph showing the weight percentage of the atoms present on the membrane surface from the elemental mapping study of FIG. 11A. Carbon (C) is 63.31 wt %; oxygen (O) is 23.91 wt %; phosphorous (P) is 2.12 wt %; and sulfur is 10.66 wt %. The inclusion of the P atom clearly indicates the successful incorporation of KISR-Zn-MOF on to the TFN membrane surface.

Figure 12A:
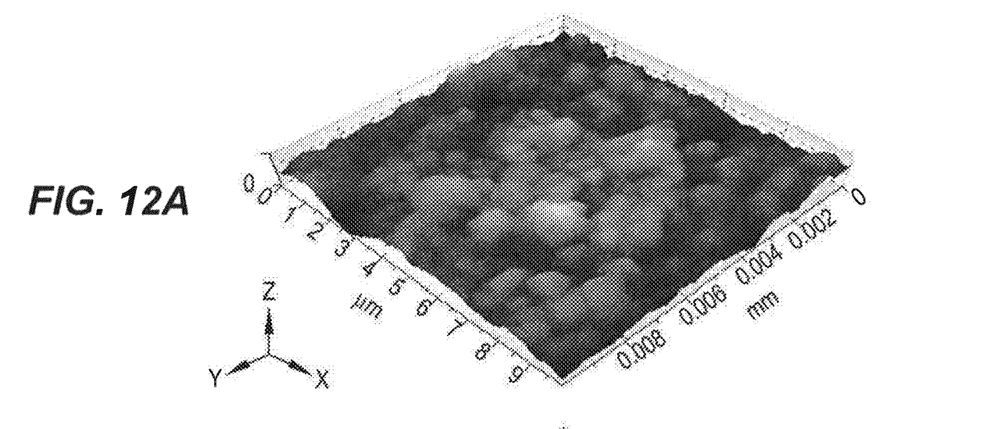
FIG. 12A is an atomic force microscope (AFM) image of the TFC-KISR-Zn-0 thin film composite membrane.
Figure 12B:
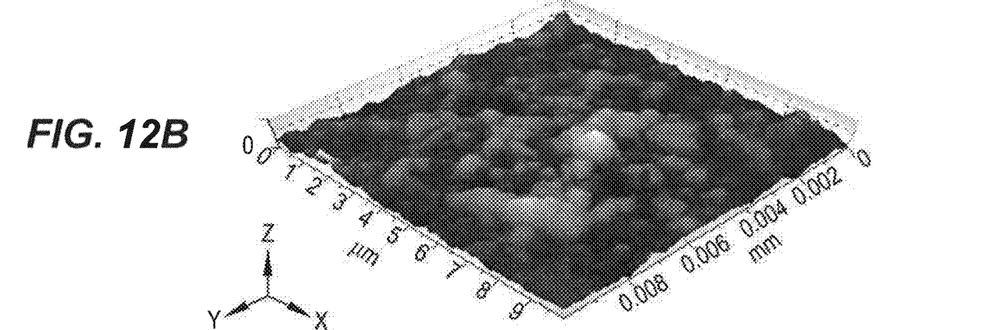
FIG. 12B is an atomic force microscope (AFM) image of the TFN-KISR-Zn-0.05 metal organic framework-based thin film nanocomposite (TFN) membrane.
Figure 12C:
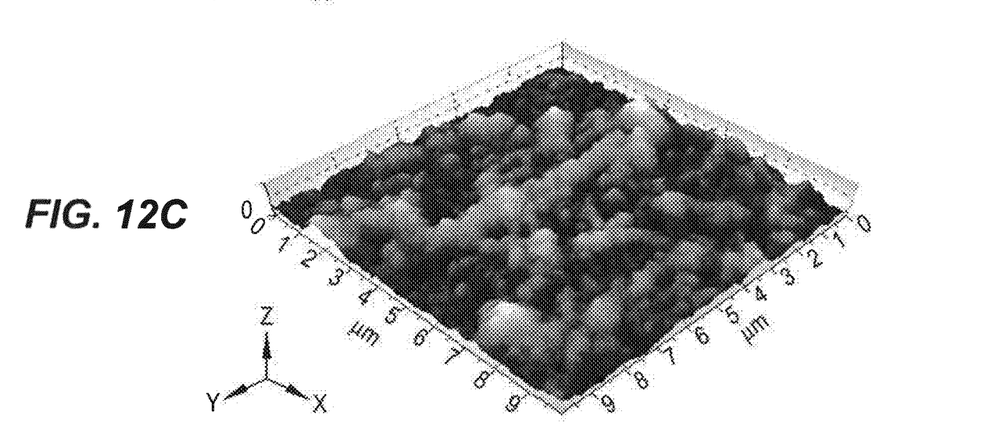
FIG. 12C is an atomic force microscope (AFM) image of the TFN-KISR-Zn-0.1 metal organic framework-based thin film nanocomposite (TFN) membrane.

FIGS. 12A, 12B and 12C are, respectively, atomic force microscope (AFM) images of the TFC-KISR-Zn-0 thin film composite membrane, the TFN-KISR-Zn-0.05 metal organic framework-based thin film nanocomposite (TFN) membrane, and the TFN-KISR-Zn-0.1 metal organic framework-based thin film nanocomposite (TFN) membrane. The TFC and TFN NF membrane surfaces were characterized in terms of mean roughness using the AFM. For each, a membrane section of 10 μm×10 μm was scanned to obtain a mean roughness parameter. The average surface roughness parameter (Sq) of the membranes increased in the order of TFN-KISR-Zn-0.1 (Ra=115 nm)>TFN-KISR-Zn-0.05 (Ra=125 nm)>TFC-KISR-Zn-0 (Ra=140 nm). This implies that the surface roughness of the TFN membranes increases gradually with the increased MOF concentration on the membrane surface. The loading of nanofillers on the membrane surface generates additional ridges and valleys on the membrane surface. Further, the SEM study confirmed the formation of more globular structures due to the loading of MOF, leading to the formation of rougher surfaces.

The contact angle of the TFC-KISR-Zn-0, TFN-KISR-Zn-0.05 and TFN-KISR-Zn-0.1 membranes were determined by the sessile drop method using a contact angle goniometer. In this method, a drop of water was allowed to drop on the surface of the membrane and, after 30 seconds, the angle between the solid membrane sample's surface and the tangent of the droplet's ovate shape at the edge of the droplet was measured using the goniometer. The average value obtained after three measurements over different areas of the membrane was then determined.

Generally, the lower the contact angle value, the higher the hydrophilicity of the membrane surface to enhance the water transport through the membrane. The TFC-KISR-Zn-0 membrane showed a contact angle of 56.94°. The study revealed that the surface contact angle values of the TFN-KISR-Zn-0.05 and TFN-KISR-Zn-0.1 membranes were reduced to 52.4° and 48.6°, respectively, after increased loading of the MOF material. The reduced contact angle, or increased surface hydrophilicity, indicates the affinity of the MOF material towards water molecules. Such water affinity interactions are highly essential to apply the membranes in desalination applications to attain high flux values.

The molecular weight cut off (MWCO) study of the TFC-NF and TFN-NF membranes were performed by filtration experiments using aqueous solutions of polyethylene glycol (PEG) of molecular weights Mw=100, 200, 400, 500 and 1000 Da. For each experiment, the PEG feed solution concentration was maintained at 1 g/L and the pressure applied during rejection tests was 150 psi at 25° C. The concentrations of the PEG permeate samples were measured by gel permeation chromatography with a refractive index (RI) detector. The MWCO of the TFC-KISR-Zn-0, TFN-KISR-Zn-0.05 and TFN-KISR-T3P-Zn-0.1 membranes were 175 Da, ~152 Da and 130 Da, respectively. It should be noted that the MWCO of both MOF-based TFN membranes was less than that of commercial NF-90 (MWCO=200-300 Da) and NF270 (Mw=300-400 Da) samples.

The pretreatment performance test for the NF membranes was performed using a lab-scale Sepa cross/tangential flow cell from the Sterlitech® Corporation of Washington. The Sepa cell has an effective membrane area of 140 cm$^2$ with a maximum operating pressure of 1000 psi (69 bar). The feed water sample was collected from the Doha East power station in Kuwait, and passed through the UF membrane (the specifications are given in Table 2 below) to remove any suspended solids. The chemistry of the filtered seawater is presented below in Table 3.

TABLE 3

Seawater Chemistry

| | |
|---|---|
| Seawater PH | 8.13 |
| TDS | 42.82 g/L |
| Na$^+$ | 14.937 g/L |
| Mg$^{2+}$ | 1.50 g/L |
| Ca$^{2+}$ | 0.518 g/L |
| SO$_4^{2-}$ | 4.30 g/L |
| Cl$^-$ | 25.98 g/L |
| K$^+$ | 0.448 g/L |
| B$^{3+}$ | 3.75 g/L |

Table 4 below shows a comparison of salt rejection and flux data of the TFC-KISR-Zn-0, TFN-KISR-Zn-0.05 and TFN-KISR-Zn-0.1 membranes against commercial NF membranes. The NF pretreatment trials for the TFC-KISR-Zn-0, TFN-KISR-Zn-0.05 and TFN-KISR-Zn-0.1 membranes were performed using feedwater samples collected from the Doha East power station in Kuwait, with a TDS of 42.82 g/L.

TABLE 4

Comparison of Salt Rejection and Flux

| | Seawater TDS (g/L) | pH | Permeability (L/m$^2$/h/bar) | Rejection (%) | | | | | | |
|---|---|---|---|---|---|---|---|---|---|---|
| | | | | Na$^+$ | Mg$^{2+}$ | K$^+$ | Ca$^{2+}$ | Cl$^-$ | SO$_4^{2-}$ | B$^{3+}$ |
| TFC-KISR-Zn-0 | 42.82 | 8.1 | 1.2 | 36.5 | 52.4 | 41.3 | 56.7 | 13.9 | 76.2 | 17.8 |
| TFN-KISR-Zn-0.05 | 42.82 | 8.1 | 2.6 | 58.9 | 84.2 | 45.2 | 71.8 | 46.7 | 96.2 | 32.3 |
| TFN-KISR-Zn-0.1 | 42.82 | 8.1 | 3.2 | 66.5 | 88.6 | 48.7 | 76.9 | 49.2 | 98.5 | 35.4 |
| NF90 (Dow ® Filmtec ®) | 43.69 | 8.1 | 1.8 | 29.26 | 16.69 | 37.25 | 57.16 | 15.1 | 56.86 | 17.2 |
| NF270 (Dow ® Filmtec ®) | 43.69 | 8.1 | 5.63 | 8.99 | 16.9 | 16.8 | 30.8 | 5.92 | 51.7 | 13.9 |
| NF200 (Dow ® Filmtec ®) | 41.3 | 8.09 | 3.82 | 30.1 | 84.5 | 22.0 | 60.2 | 20.1 | 98.1 | NA |
| K-SR2 (Koch ®) | 41.3 | 8.09 | 72.0 | 4.2 | 70.0 | 5.4 | 56.2 | 5.2 | 98.0 | NA |
| NF99-HF (Alfa Laval ®) | 41.3 | 8.09 | 54.7 | 11.1 | 81.2 | 19.6 | 62.0 | 22.1 | 97.2 | NA |
| ESNA 1-LF2 (Hydranautics ®) | 41.3 | 8.09 | 112.3 | 10.2 | 22.2 | 9.8 | 18.2 | 8.1 | 60.2 | NA |
| NF270-4040 (Dow ® Filmtec ®) | 31.3 | NA | NA | 30.1 | 65 | 6.2 | 38.2 | 13.2 | 99.0 | NA |

TABLE 2

Specifications of UF Membrane

| | |
|---|---|
| pH range (25° C.) | 1-11 |
| Flux | 85/30 GFD/psi |
| MWCO | 10,000 Da |
| Polymer | Polyethersulfone |
| Vendor | GE ® Osmonics of New York |

From Table 4, it can be seen that the selectivity, in terms of salt rejection, offered by the TFN-KISR-Zn-0.05 and TFN-KISR-Zn-0.1 membranes is higher than any commercial NF membrane samples. In nanofiltration technology, there is a trade-off issue between the flux and rejection. However, it should be noted that the permeability of the TFN-KISR-Zn-0.05 and TFN-KISR-Zn-0.1 membranes has very high salt rejection when compared against the commercial NF membranes.

It should be understood that, in addition to the filtering of seawater, the thin film nanocomposite membranes may be used for a wide range of applications, including, but not limited to, gas separation, desalination/ion separation, gas storage, catalysis, imaging and sensing applications, water vapor capture and dehumidification (i.e., water harvesting), semiconductors, controlled drug release, $CO_2$ capture, biomimetic mineralization, ferroelectric and multiferroic applications, and the like, as well as being tailored for various other membrane-based desalination technologies, such as, but not limited to, reverse osmosis, ultrafiltration, forward osmosis, membrane distillation, electrodialysis, pressure-assisted and retarded osmosis, and the like.

It is to be understood that the method for making metal organic frameworks and thin film nanocomposite membranes using the same is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for making metal organic frameworks, comprising the steps of:
   dissolving a metal salt in deionized water to form a first solution, wherein the metal salt is $ZnCl_2$;
   adding a cyclic propyl phosphonic anhydride reagent to the first solution to form a second solution;
   heating the second solution at a temperature of 80° C. to form a reaction mixture containing metal organic framework crystals;
   cooling the reaction mixture to 26° C. and filtering the metal organic framework crystals therefrom;
   washing the metal organic framework crystals; and
   drying the metal organic framework crystals.

2. The method for making metal organic frameworks as recited in claim 1, wherein the metal salts are formed from a metal selected from the group consisting a d-block metal, a f-block metal, a p-block metal, an alkali metal, and an alkaline earth metal.

3. The method for making metal organic frameworks as recited in claim 1, wherein the second solution is stirred for 10 minutes prior to the step of heating the second solution.

4. The method for making metal organic frameworks as recited in claim 1, wherein the step of heating the second solution comprises heating the second solution at 80° C. for 36 hours.

5. The method for making metal organic frameworks as recited in claim 1, wherein the step is washing the metal organic framework crystals is performed three times.

6. The method for making metal organic frameworks as recited in claim 1, wherein the step of drying the metal organic framework crystals comprises drying the metal organic framework crystals at 50° C. for 48 hours.

7. A method for making metal organic frameworks, comprising the steps of:
   dissolving a metal salt in deionized water to form a first solution, wherein the metal salt is $CuSo_4$;
   adding a cyclic propyl phosphonic anhydride reagent to the first solution to form a second solution;
   heating the second solution at a temperature of 80° C. to form a reaction mixture containing metal organic framework crystals;
   cooling the reaction mixture to 26° C. and filtering the metal organic framework crystals therefrom;
   washing the metal organic framework crystals; and
   drying the metal organic framework crystals.

* * * * *